United States Patent [19]

Happ

[11] Patent Number: 4,646,954
[45] Date of Patent: Mar. 3, 1987

[54] RAILROAD RAIL FRAGMENTING APPARATUS AND METHOD FOR FRAGMENTING RAILS

[75] Inventor: Mathias Happ, Northbrook, Ill.

[73] Assignee: Happs, Inc., Northbrook, Ill.

[21] Appl. No.: 701,414

[22] Filed: Feb. 14, 1985

[51] Int. Cl.$^4$ ............................ B23P 17/02; B26F 3/00
[52] U.S. Cl. ....................................... 225/2; 225/96.5; 225/103
[58] Field of Search ...................... 225/2, 96, 96.5, 103

[56] References Cited

U.S. PATENT DOCUMENTS

| | | | |
|---|---|---|---|
| 1,276,278 | 8/1918 | Smallwood | 225/103 |
| 1,284,312 | 11/1918 | Glover | 225/103 |
| 4,346,828 | 8/1982 | Crawley | 225/103 X |
| 4,383,630 | 5/1983 | Solomon et al. | 225/103 |
| 4,444,345 | 4/1984 | Solomon et al. | 225/96.5 |
| 4,522,323 | 6/1985 | LaBounty | 225/2 |
| 4,552,291 | 11/1985 | Schott | 225/96.5 |

FOREIGN PATENT DOCUMENTS 602320  4/1978  U.S.S.R. ............................ 225/96.5

Primary Examiner—Frank T. Yost
Attorney, Agent, or Firm—Neuman, Williams, Anderson & Olson

[57] ABSTRACT

An apparatus for and a method of fragmenting or subdividing bars or railroad rails are disclosed in which a plurality of rails are lifted by a front-end loader and placed on their sides on a chain driven roller system. Three sets of hydraulic cylinder and plunger assemblies actuate holding, notching and breaking mechanisms which are used to fragment the rails. Actuation of the first pair of hydraulic cylinder and plunger assemblies causes the activation of a hold-down bar which prevents movement of the rails and actuation of the second pair of hydraulic cylinder and plunger assemblies causes a knife member to notch the bottom flange of each rail. The third pair of hydraulic cylinder and plunger assemblies is mounted at a non-perpendicular angle to the horizontal. Operator actuation of this third pair of cylinders causes a breaking member, which pivots about an axis below the rails, to travel in an arc. The breaking member engages the portions of the rails beyond the notches and bends them until breaking occurs.

10 Claims, 5 Drawing Figures

RAILROAD RAIL FRAGMENTING APPARATUS AND METHOD FOR FRAGMENTING RAILS

BACKGROUND OF THE INVENTION

This invention relates to an apparatus for and method of fragmenting elongated articles, and more particularly, relates to an apparatus for and method of fragmenting or subdividing railroad rails.

As the iron rails of railroad tracks age and wear, it becomes necessary to remove and replace the worn rails. In other instances, where the bed is no longer in use, it is desirable to remove all of the rails. Since the rails as removed from the beds are too long for convenient handling and processing, it is desirable to fragment the rails for ease of shipment and subsequent re-melting and re-forging.

Machines have been developed for fragmenting rails and other elongated articles into smaller pieces such as those described in U.S. Pat. No. 1,276,278 issued to Smallwood Aug. 20, 1918 for "Machine For Breaking Steel Into Shell Blanks"; U.S. Pat. No. 1,284,312 issued to Glover Nov. 12, 1918 for "Mechanism For Breaking Steel Bars"; U.S. Pat. No. 4,346,828 issued to Crawley Aug. 31, 1982 for "Railroad Rail Fragmenting Apparatus and Method" and U.S. Pat. No. 4,444,345 issued to Solomon et al. Apr. 24, 1984 for "Rail Lifting And Cutting Machine".

The Smallwood '278 patent describes a machine for breaking metallic bars into determinate lengths by pressure being brought to bear on an overhanging or cantilevered portion of the bar, which has been previously nicked at the point where it is desired to have the break occur. The breaking member is designed to be reciprocated substantially vertically and ordinarily extends approximately vertically.

The Crawley '828 patent describes a rail fragmenting apparatus and method in which a righting means is employed for engaging the rails and shifting them to an upright position. Chisel means place oppositely arranged notches in the outer edges of the base flanges of the rails. Pressure is brought to bear on the outer base flanges of the rails until fracture occurs. Breaking occurs by actuation of laterally spaced pairs of plunger and cylinder assemblies perpendicular to the rails and located downstream from the notched edges.

The Solomon '345 patent describes an apparatus for simultaneously removing and severing rails from a rail bed. In one embodiment, a ram is used which is essentially perpendicular to the rail throughout the initial bending and final severing of the rail. In an alternative embodiment, pivotal movement of a hammer and blade around a shaft means located above the rail causes the rail to sever along the score line previously made in the top surface of the rail by the blade mechanism. The shaft about which the hammer and blade rotate is located above the rails to be fragmented. The rocking action of the hammer and blade means facilitates the severing of the rail.

The Glover '312 patent describes a mechanism for breaking bars which uses a knife to nick or score the bar and a die which inclines from the front downward toward the rear so that the greatest possible force of the die will be applied at the greatest possible distance from the nicked or scored portion of the bar.

For the present invention, it is highly desirable to have a rail fragmenting apparatus which provides a smooth and efficient breaking means. While all of the above discussed patents describe a method for severing rails or bars, they all rely on a breaking member which imparts a guillotine type action placing an impact load on the bars being broken. In particular, the breaking members of these earlier devices travel in a substantially vertical direction, not an arcing fashion. Moreover, none of these devices describe a breaking bar which pivots around a shaft or pin located below the rail. As a result, the operation of these earlier devices requires a great amount of force to break the nicked rail and can cause the entire apparatus to be jolted through the impact load. Repeated use of such apparatus with the associated imbalances causes parts to become loosened or weakened. In addition, in the apparatus which uses a pivoting breaking member, the location of the pivoting shaft above the rail or bar being broken provides reduced breaking forces.

It is therefore a general object of this invention to provide an improved rail cropper which operates more smoothly and efficiently.

Another object of this invention is to provide an apparatus of the type set forth in which the breaking member has an arcing motion rather than a guillotine motion.

Another object of this invention is to provide an apparatus of the type set forth in which the breaking member imparts a bending action to the rail rather than an impact load.

Another object of this invention is to provide an apparatus of the type set forth in which the breaking member pivots around a shaft or pin located below the rails to provide greater breaking forces.

Other objects and advantages of this invention will become apparent upon reading the following detailed description and appended claims, and upon reference to the accompanying drawings.

SUMMARY OF THE INVENTION

In accordance with one preferred embodiment of this invention for fragmenting railroad rails, the aforementioned requirements and objects are satisfied through a railroad rail fragmenting apparatus which uses a breaking member pivoted about a shaft located below the rails and which moves in an arcing manner. In particular, the fragmenting apparatus includes three pairs of hydraulically actuated cylinder and plunger assemblies connected to a hold-down member, a knife member and the breaking member respectively. The breaking member has a stop portion against which the ends of rails to be fragmented can be abutted and a breaker portion. The stop portion is adjustable so that the lengths of the fragmented rails can be varied.

In operation, a plurality of rails or bars are fed along a chain driven roller system on their sides with one part of the base flange turned up, stopping when they reach and contact the stop portion at the inside of the breaking member. The hold-down member is then actuated, pressing and holding the rails against a platform. With the hold-down member actuated, the knifing member is actuated which places a notch or nick in the exposed base flange of each rail. The knife member is then retracted. The breaking member is then actuated. This breaking member with the breaker portion moves in an arc, fracturing the rails at the point of the previously placed notches. To accomplish this arcing motion, the breaking member and cylinder and plunger assemblies pivot about shafts or pins which are located below the rail being broken and at each end of the cylinder and plunger assemblies. The resulting arcing motion is smoother and more efficient than other rail fragmenting devices. The fractured rails are then taken away by conveyor.

DESCRIPTION OF THE DRAWINGS

For a more complete understanding of this invention, reference should be made to the embodiments illustrated in greater detail in the accompanying drawings and described below by way of examples of the invention.

DETAILED DESCRIPTION

Figure 1:
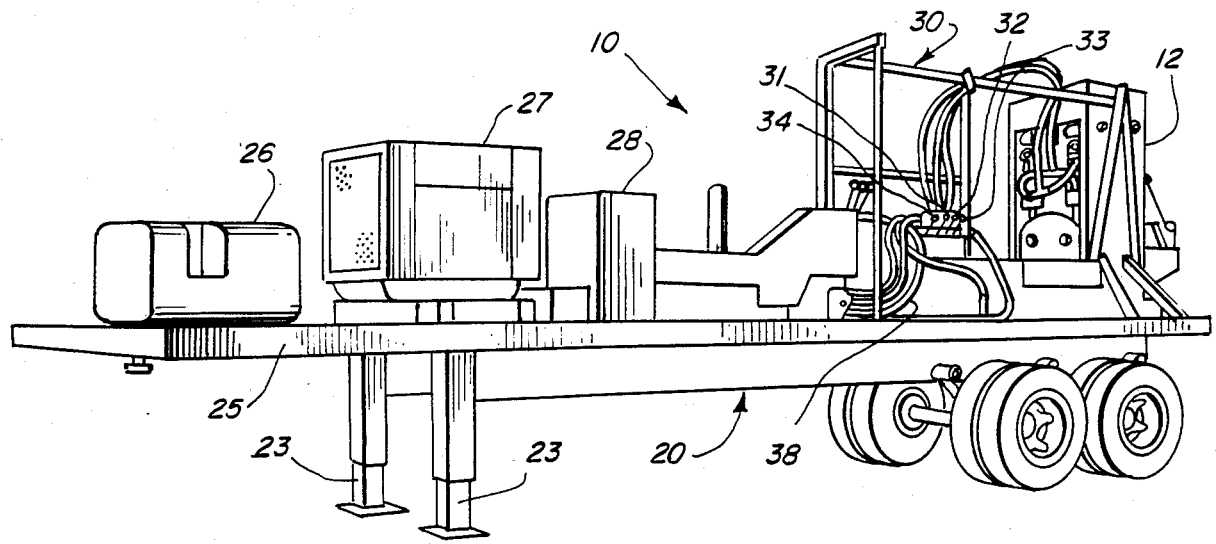
FIG. 1 is a perspective view of a railroad fragmenting apparatus on a long-bed truck trailer embodying preferred teachings of this invention.
Figure 2:
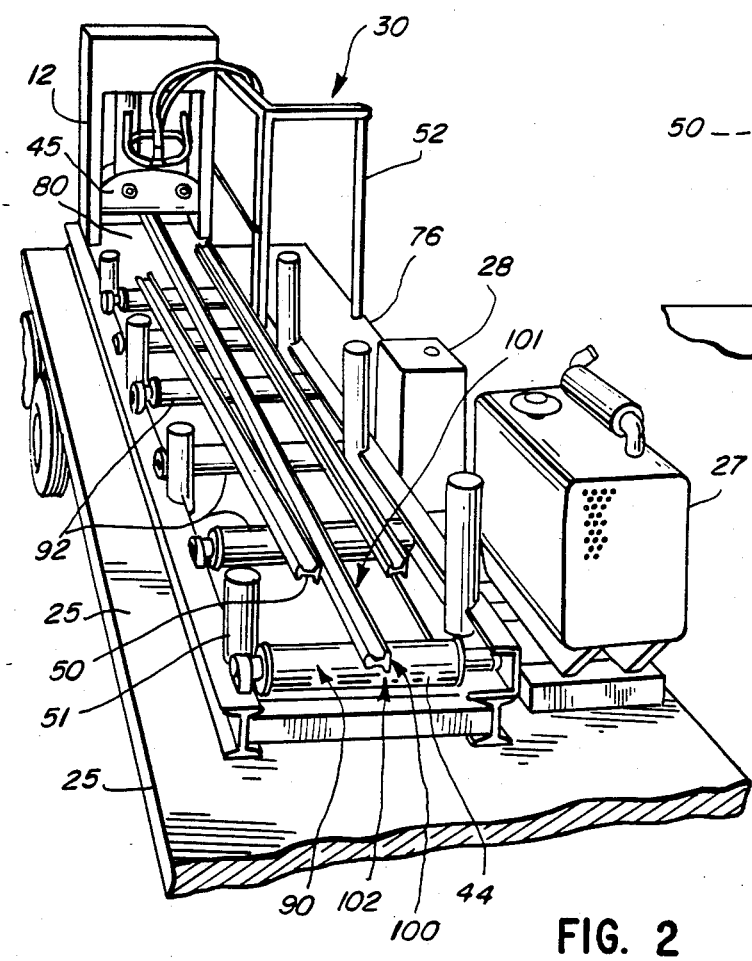
FIG. 2 is another perspective view of the apparatus shown in FIG. 1 along the feeding conveyor.

Referring to FIGS. 1 and 2, a railroad rail fragmenting system 10 embodying the features of the present invention is illustrated. The fragmenting apparatus 12 sits on truck trailer 20 with a trailer bed or long-bed 25 and truck trailer 20 with independently operated, hydraulically actuated legs 23 for raising and lowering the long-bed 25. Along the trailer bed 25, sits a fuel tank 26, an industrial engine 27 and a reservoir 28 for hydraulic fluid. The industrial engine 27 operates with fuel from the tank 26, creating a pressure for the oil stored in the hydraulic fluid reservoir 28.

The fragmenting apparatus 12 sits along the side of the operator area 30. The construction of the apparatus 12 shown in the drawings is such that up to seven rails can be fragmented into lengths varying from 18 inches to five feet while advancing along a chain driven roller system 44 as shown in FIG. 2. It should be understood that design changes could be made by one skilled in the art to accommodate a greater or lesser number of rails. A catwalk 76 is located along the trailer bed 25. A first lever 34, controls the operation of the chain driven roller system 44 as shown in FIG. 2. Operation of the pairs of hydraulic cylinder and plunger assemblies of the fragmenting apparatus occurs by actuation of second, third and fourth levers 31, 32 and 33. The second lever 31 controls the actuation of a hold-down cylinder and plunger assembly 41 shown in FIG. 4. The third lever 32 controls the actuation of a breaking cylinder and plunger assembly 43 shown in FIG. 4. The fourth lever 33 controls the actuation of a knife member cylinder and plunger assembly 42 shown in FIG. 4.

Referring to FIG. 2, rails 50 ride on the chain driven roller system 44. The chain driven roller system 44 is adapted to receive rails 50 from a front end loader (not shown) at the loading end 90 of the roller system 44. Rails are placed on their sides as shown in FIG. 2 by loading them as such or using a device (not shown) to turn them on their sides.

Each rail 50 as illustrated in FIG. 2 has a flange portion 100 such that when the rail is on its side an upside 101 of the flange portion is exposed and a downside 102 of the flange portion contacts the chain driven roller system 44. A fragmented rail 53 is shown in FIGS. 3 and 5.

Rails to be fragmented by the apparatus 12 are transported along the chain driven roller system by a number of rollers 92. Guide posts 51 direct the rails towards the fragmenting apparatus 12. Outside of the guideposts 51 is the catwalk 76 along the edge of long-bed 25 where the operator area 30 is located. The operator area 30 is enclosed by guard rails 52 to protect the operator and controls from moving rails.

Figure 3:
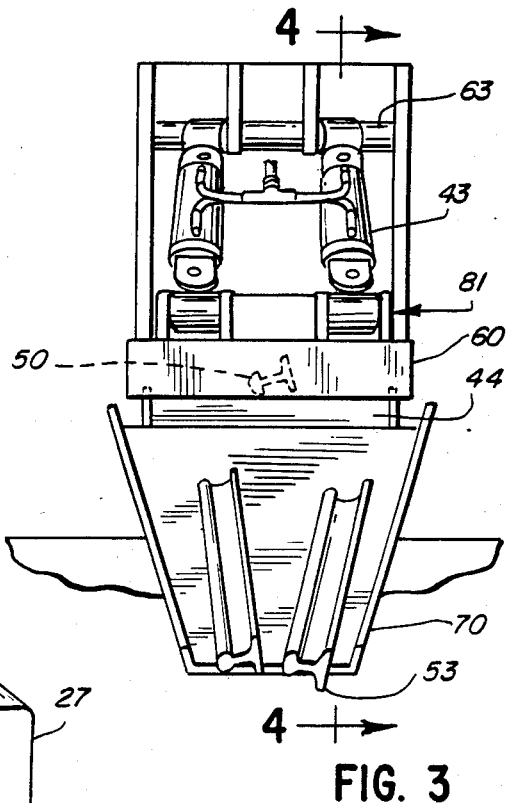
FIG. 3 is a front view of the apparatus shown in FIG. 1 illustrating the breaking member and the hydraulically actuated cylinder and plunger assemblies associated with the breaking member.
Figure 4:
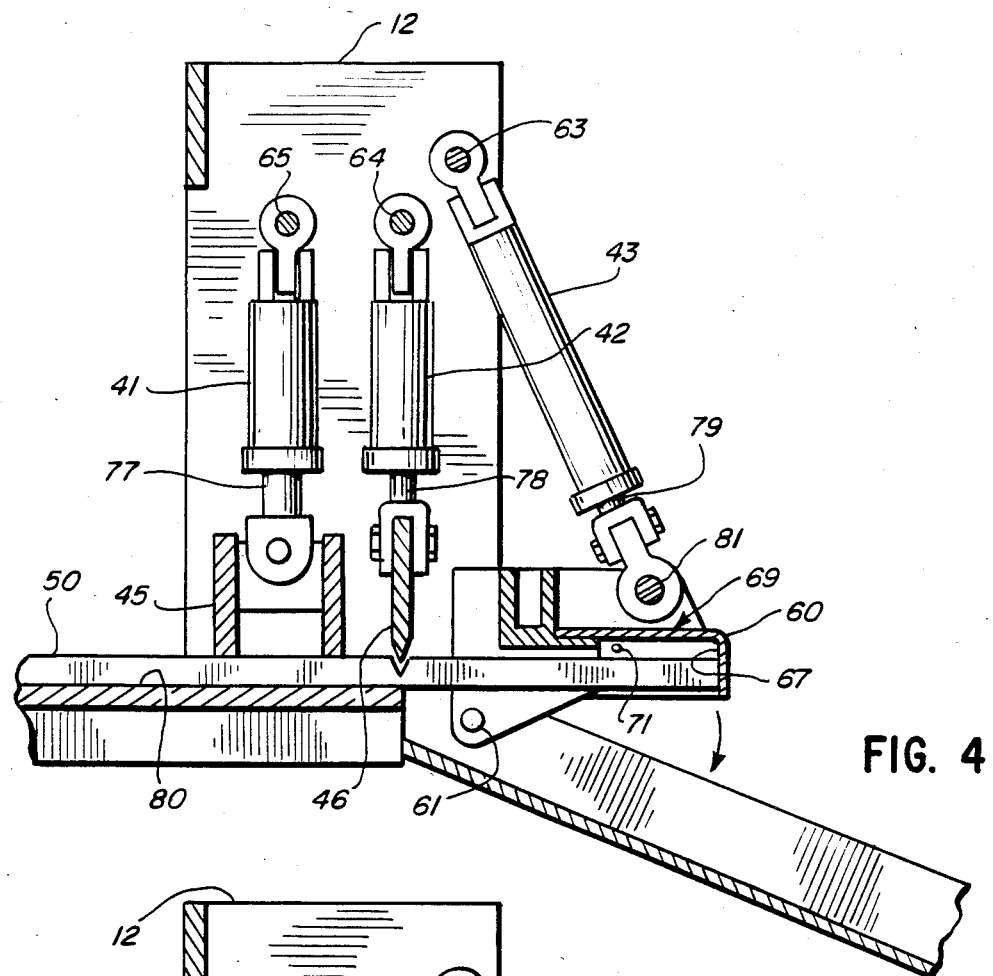
FIG. 4 is a section through line 4—4 at the nicking stage of operation of the apparatus of FIG. 3 showing the hold-down member in an actuated position, the knife member in an actuated position and the breaking member in a retracted position.
Figure 5:
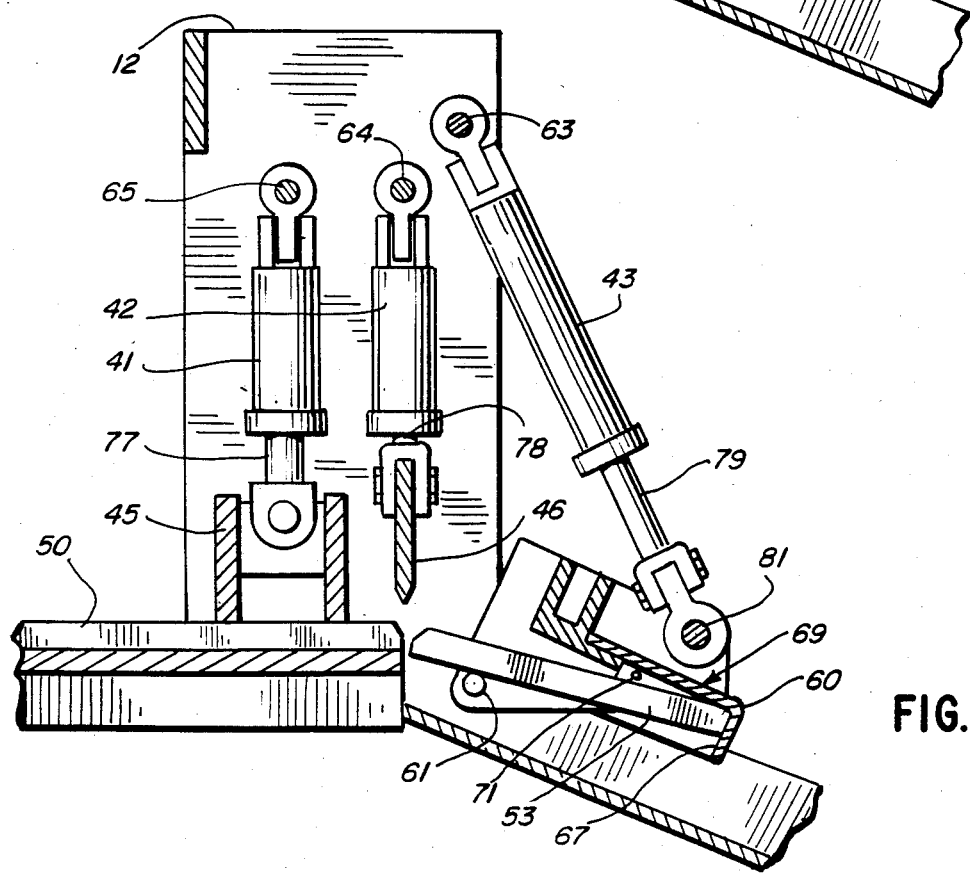
FIG. 5 is a section through line 4—4 at the breaking stage of operation of the apparatus of FIG. 3 where the hold-down member is in an actuated position, the knife member in a retracted position and the breaking member in an actuated position.

FIGS. 3, 4 and 5 show the three pairs of laterally spaced plunger and cylinder assemblies 41, 42 and 43 which have extensible and retractable plungers 77, 78 and 79. The structure of each plunger and cylinder assembly is substantially identical. Each plunger and cylinder assembly is supported by and pivots around pins or shafts 63, 64 and 65. The hold-down cylinders 41 and the knifing cylinders 42 are mounted in a substantially vertical position. The breaking cylinders 43 are mounted at a non-perpendicular angle to the horizontal. The breaking cylinders 43 control the movement of the breaking member 60. Each breaking cylinder 43 is capable of rotation about a common shaft or pin 63. Broken rails 53 slide along a spring-loaded exit table 70 as they leave the system.

Referring to FIG. 4, the hold-down cylinder 41, which controls the movement of the hold-down bar 45, is shown in its actuated position contacting a rail 50. The actuated hold-down bar 45 contacts the rails and holds them against a platform 80 during the notching and breaking operations. In order to support a portion of each rail in the fragmenting apparatus 12 so that the portion of the rails extending beyond the platform 80 may be broken off, the hold-down member 45 is provided to press the rails against the platform 80 during the notching or nicking and breaking operations. This platform 80 lies below the rollers 92. The knifing cylinder 42 controls the movement of a knife member 46, also shown in FIG. 4 in an actuated position. The knife member 46 is designed to insert a notch in the upside 101 of the flange portion of each rail 50.

The breaking cylinder 43, which controls the movement of the breaking member 60, is shown in FIG. 4 in its retracted position. The breaking member 60 is used to break notched or nicked rails at its breaking portion 69. Rails being moved along the chain driven roller system 44 are pushed against a stop portion 67 of the breaking member 60 such that they cannot move any further. This stopping portion 67 can be adjusted outwardly or inwardly by loosening the screws 71 located on the sides of the breaking member and sliding the stop portion 67. As a result, rails can be fragmented into varying lengths.

As shown in FIGS. 4 and 5, the breaking member 60 is arranged so that it pivots about a shaft or pin 61 located below the stopped and held rail 50 to be broken. The pivoting of the cylinder assembly 43 around the shafts 63, 81 and the pivoting of the breaking member 60 around the shafts 81, 61 imparts an arcing motion to the breaking bar 60 as it is actuated.

Referring to FIG. 5, the hold-down bar 45, plunger 77 and the breaking member 60 are shown in the actuated position. The knife member 46 is shown in its retracted position. As stated earlier, the location of the pin 61 of the breaking member is below the level of the rails 50 to be fragmented.

After the rails are broken, the fragmented portions 53 fall down the spring-loaded exit table 70 onto another conveyor (not shown). The table is spring-loaded to absorb the shock of the breaking bar. Also, in some instances where the rail does not make a complete break (as when it is held by a piece of flow from the top side of the rail), the spring-loaded table 70 can be subjected to an additional stress from the partially broken rail when the breaking member is reactuated to break another group of rails. In such instances, the spring-loaded table will move down to accommodate the hanging portion of the rail until the rail finally breaks completely. These fragmented portions 53 of the rails are carried by the conveyor (not shown) to another area where they are stored prior to reprocessing.

Fragmenting of rails continues by advancing rails to the stop 67 of the breaking member 60 and breaking until the rails are completely fragmented and new rails may be loaded.

OPERATION OF THE APPARATUS

The operation of the fragmenting system 10 may be summarized as follows:

Fluid under pressure is supplied to the cylinder assemblies 41, 42, 43 and to the unit (not shown) driving the chain driven roller system 44.

The industrial engine 27, fueled from the tank 26, causes pressure throughout the hydraulic fluid in the reservoir 28. The rails 50 to be fragmented by the apparatus 12 are placed on their sides on the chain driven roller system 44 so that the flange portion 100 has its upside portion 101 exposed. Operator actuation of the first lever 34 sets in motion the chain driven roller system 44 causing the rails 50 to move toward the fragmenting apparatus 12. Guide posts 51 prevent the rails from leaving the roller system 44.

The rails 50 enter the fragmenting apparatus 12 and contact the stop end 67 of the breaking member 60. The operator then stops the chain roller system 44 by actuating the hydraulic system through the first lever 34.

Next, the hold-down bar 45 is actuated by operation of the second lever 31. Movement of this second lever 31 causes the hydraulic fluid to actuate the cylinder assembly 41 and plunger 77 causing the hold-down bar 45 to move into the actuated position shown in FIGS. 4 and 5.

With the hold-down bar 45 actuated, the knifing operation is next. The operator actuates the fourth lever 33 which causes a movement of the the plunger 78 in the hydraulic cylinder 42. The movement of the plunger 78 actuates the knife member 46. The knife member 46 places a notch or nick in the exposed upside 101 of the flange of the rail (or rails) to be broken. Following the notching of the rail 50, the knife member is retracted. The hold-down bar 45 remains in the actuated position throughout the knifing operation.

With the knifing member retracted and the hold-down bar still actuated, the breaking operation is next. The third actuating lever 32 causes an extension of the plunger 79 in the cylinder 43. As shown in FIG. 5, the breaking portion 69 of the breaking member 60 contacts the rails 50 and bends them over the end of the platform 80 causing a breaking of the rails 50 at the location of the notch, previously placed in the base flange. The breaking member 60 pivots around the pin or shaft 61, at its lower end, and pivots around the shaft 81 at its upper end. This pivoting coupled with the pivoting of the cylinder assembly 43 around its shaft 63, and the plunger around the pin or shaft 81, imparts an arcing motion to breaking member 60. This arcing motion provides for the smooth operation of the breaking of the rail. As opposed to the guillotine action of prior rail cropper devices which cause a jolt to the entire apparatus through an impact load, the applicant's breaking member moves in an arcing manner which makes the breaking operation smoother. In addition, because the breaking member pivots about a pin or shaft located below the rail or rails being broken, a greater amount of torque is available for application by the breaking member to the rail than if the pivot pin were at the same level or above the level of the rail.

Broken rails 53 drop onto the spring-loaded table 70 as shown in FIG. 3 and are removed from the work area by a conveyor system (not shown). This spring-loaded table 70 absorbs the weight of broken bars and any extra stress from bars which are not completely broken which jam into the table when the breaking member is actuated again.

After breaking, the breaking member 60 is retracted through operation of the third lever 32. Once the breaking bar 60 is returned to its retracted position, the hold-down bar 45 is retracted. Unbroken portions of the rails 50 are then fed into the fragmenting apparatus 12 by operation of chain driven rollers 44 until they are stopped and the hold-down, notching and breaking operations are repeated. After the entire rails are broken into fragments, additional rails can be fed to the conveyor system.

Thus a railroad rail fragmenting apparatus and method for fragmenting rails have been provided which meet the aforestated objects of this invention. That is, by using a breaking member which moves in an arc-like manner and which pivots below the rail to be fragmented, a smooth and efficient breaking operation can be accomplished. The method of actuating the fragmenting apparatus i.e., the use of levers to actuate hydraulic plungers and cylinders, is simply part of a preferred embodiment of this invention and other methods of operation, such as automatic controls could be used to accomplish the same results.

While a preferred embodiment of the invention has been shown, it will be understood, of course, that the invention is not limited thereto since modifications may be made and other embodiments of the principles of this invention will occur to those skilled in the art to which this invention pertains, particularly upon considering the foregoing teachings. It is, therefore, contemplated by the appended claims to cover any such modifications and other embodiments as incorporate those features which constitute the essential features of this invention within the true spirit and scope of the following claims.

What is claimed is:

1. An apparatus for fragmenting one or more rails comprising a support member adapted to support said rails, a hold-down member adapted to retain said rails against said support member, a nicking member adjacent to said hold-down member adapted to nick said rails, said support member subjacent to said hold-down member and said nicking member, and a breaking member adjacent to said nicking member, said breaking member including a pivot portion located below a plane containing said support member and a breaking portion, said breaking portion adapted to move in an arcing fashion in response to movement of said pivot portion so that said breaking member subjects said nicked rails to a force sufficient to fragment said nicked rails.

2. The apparatus of claim 1 wherein said breaking member also includes a stopping portion adapted to position said rails.

3. The apparatus of claim 2 wherein said stopping portion includes a stop bar and adjustment means attached thereto for moving said stop bar to facilitate varying the length of the fragmented portion of the rail.

4. The apparatus of claim 1 further comprising a table extending outwardly and downwardly from said support member for receiving said fragmented portions of the rails.

5. The apparatus of claim 1 wherein said hold-down member includes a hold-down portion and a first actuation portion adapted to move said hold-down portion upwardly and downwardly.

6. The apparatus of claim 1 wherein said nicking member includes a nicking portion and a second actuation portion adapted to move said nicking portion upwardly and downwardly.

7. The apparatus of claim 1 wherein said breaking member also includes a third actuation portion adapted to pivot said pivot portion.

8. The apparatus of claim 7, wherein said third actuation portion includes a top pivot part pivotally mounted to said apparatus, a bottom pivot part pivotally mounted to said breaking portion, at least one cylinder attached to said top pivot part and a plunger extensible and retractable from said cylinder and attached to said bottom pivot part, said third actuation portion adapted with said pivot portion of said breaking member to move said breaking portion in an arcing fashion.

9. A method of fragmenting one or more rails comprising:
   positioning said rails in a predetermined manner on a support member;
   providing a nick in the upper surface of said rails; and
   applying a torque to said rails about a pivot point below a plane containing said support member to bend and fragment said rails.

10. An apparatus for fragmenting one or more rails comprising a support means for supporting said rails, a hold-down means for retaining said rails against said support means, a nicking means for nicking said rails, said nicking means adjacent said hold-down means, said support means subadjacent to said hold-down means and said nicking means, and a breaking means for imparting a force to said nicked rails sufficient to fragment said nicked rails, said breaking means adjacent said nicking means and including a pivot portion located below a plane containing said support means, said breaking means adapted to move in an arcing fashion in response to movement of said pivot portion.

* * * * *